(12) United States Patent
Featheringill et al.

(10) Patent No.: US 6,397,874 B1
(45) Date of Patent: Jun. 4, 2002

(54) DUAL BACKFLOW CHECK VALVE

(75) Inventors: Burton Addison Featheringill, Carson City, NV (US); John Merril Grooms, Rochester, IN (US)

(73) Assignee: Airvac, Inc., Rochester, IN (US)

( * ) Notice: Subject to any disclaimer, the term of this patent is extended or adjusted under 35 U.S.C. 154(b) by 0 days.

(21) Appl. No.: 09/581,603

(22) PCT Filed: Dec. 18, 1998

(86) PCT No.: PCT/US98/26981

§ 371 (c)(1),
(2), (4) Date: Oct. 11, 2000

(87) PCT Pub. No.: WO99/32816

PCT Pub. Date: Jul. 1, 1999

Related U.S. Application Data

(60) Provisional application No. 60/068,130, filed on Dec. 19, 1997.

(51) Int. Cl.[7] ................................................ F04F 3/00
(52) U.S. Cl. ........................ 137/14; 137/112; 137/205
(58) Field of Search ................................ 137/112, 205, 137/14

(56) References Cited

U.S. PATENT DOCUMENTS

| | | | |
|---|---|---|---|
| 2,225,840 A | 12/1940 | Newton | 251/118 |
| 3,139,932 A | 7/1964 | Johnson | 166/95 |
| 3,593,732 A | 7/1971 | Holscher | 137/112 |
| 3,686,693 A | 8/1972 | Liljendahl | 4/10 |
| 4,184,506 A | 1/1980 | Varis et al. | 137/205 |
| 4,191,205 A | 3/1980 | Nash | 137/375 |
| 5,056,548 A | 10/1991 | Mills | 137/15 |

*Primary Examiner*—Gerald A. Michalsky
(74) *Attorney, Agent, or Firm*—Sidley Austin Brown & Wood LLP

(57) ABSTRACT

A dual backflow check valve for use in a vacuum sewage system, wherein the check valve includes a valve body and a valve flap pivotally mounted inside the valve body, the valve body having a primary (branch) conduit and a secondary (service) conduit entering the primary conduit at an acute angle. The primary conduit has an upstream portion forming a primary inlet into the valve body and a downstream portion forming a primary outlet out of the valve body, and the secondary conduit forms a secondary inlet into the valve body. The valve flap is pivotable between two positions, a first position in which it prevents fluid from entering the secondary conduit and a second position in which it prevents fluid from entering the upstream portion of the primary conduit. Preferably, the primary conduit and the secondary conduit of the check valve are oriented in a substantially horizontal plane in the vacuum sewage system.

22 Claims, 5 Drawing Sheets

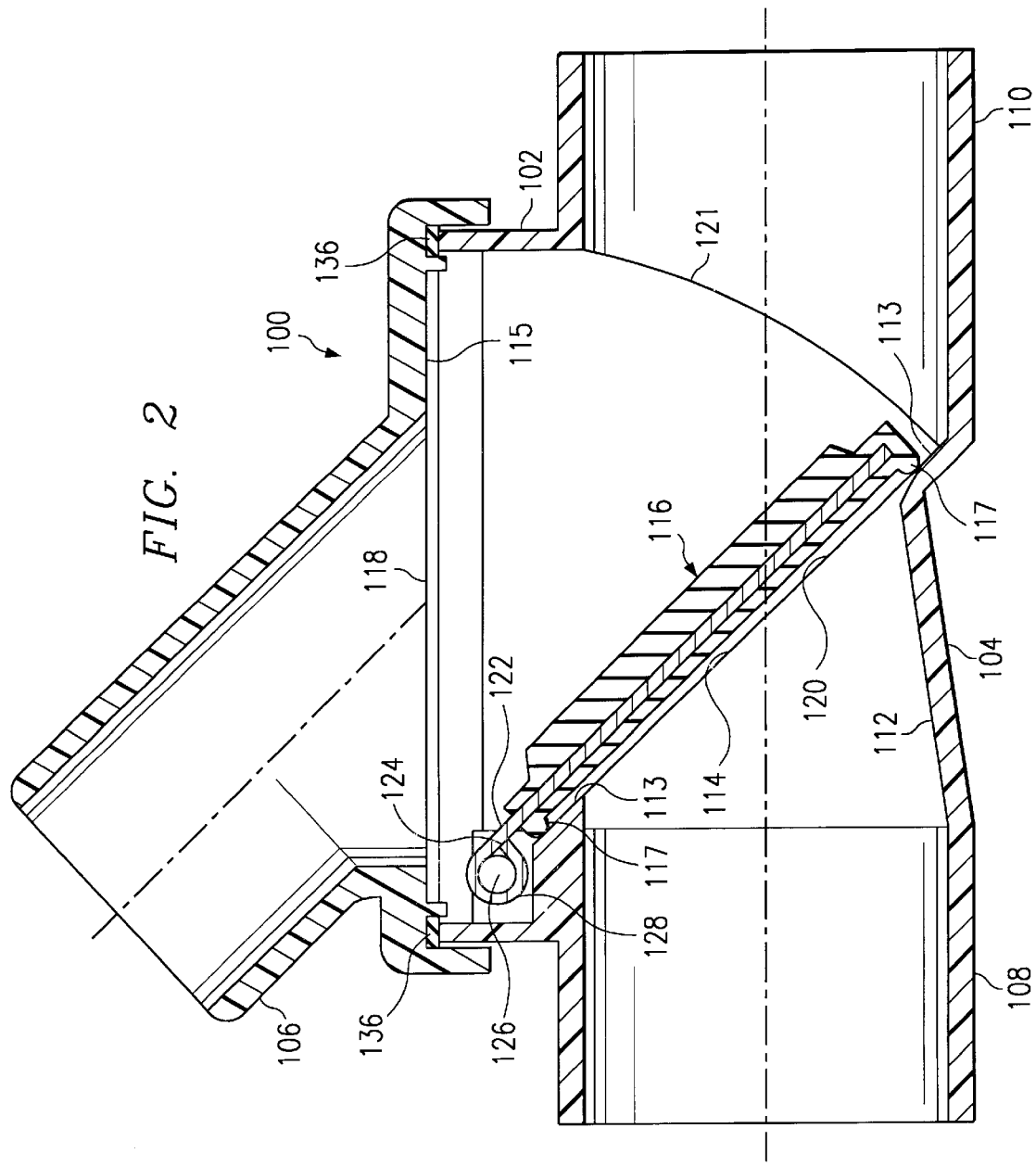

DUAL BACKFLOW CHECK VALVE

This application claims the benefit of U.S. Provisional Application Serial No. 60/068,130, filed Dec. 19, 1997.

FIELD OF THE INVENTION

This invention relates to a wye-shaped dual backflow check valve for a vacuum sewage system and a vacuum sewage system incorporating the wye-shaped dual backflow check valve.

BACKGROUND OF THE INVENTION

Check valves are often used in plumbing and piping systems to block the flow of fluid in a particular direction. Specifically, backflow check valves are designed for installation in a sewer pipe to allow sewage to pass downstream through the main line while preventing water and sewer gases from traveling upstream into another line, i.e. to prevent backflow or backsurge. Backflow check valves have been used in vacuum sewage systems such as the sewage systems disclosed in U.S. Pat. No. 4,373,838. Typically, check valves in known vacuum sewage systems are installed entirely in the service lines which feed into a branch line(s). These service lines generally flow upwardly to branch lines in the vacuum system, so check valves are installed in the service lines to prevent back surge into the service line. However, check valves are restricted in use in these systems because they frequently require maintenance. While the prior art check valves prevent backflow into the service line, backflow into the branch line is not prevented when fluid flows downstream from the service line. As a result of this problem, backflow or back surge of up to 20% of the transported fluids has been observed in the branch line. This is a significant problem because a line that becomes filled with liquid in a vacuum sewage system may fail to operate due to excessive pressure loss (i.e., may become "waterlogged").

The present invention relates to a wye-shaped check valve installed in a vacuum sewage system, wherein the check valve prevents backflow of sewage into the service line and the branch line. This is significant in that it not only prevents the possibility of filling a service line or a branch line with liquid, but also increases the operating efficiency of the system because all relevant force is applied in the proper direction of flow. Thus, sewage will be conveyed a further distance towards a disposal station with one valve (evacuation) cycle. In addition to the above-described advantages, the wye-shaped dual check valve of the present invention permits vacuum system service lines to be connected to branch lines in substantially the same horizontal plane. This provides a significant advantage because better overall drainage efficiency of the system is obtained by incorporating as few profile changes in the sewage transport lines as possible, thus allowing the fluid flow to experience as few dynamic flow changes as possible.

SUMMARY OF THE INVENTION

These and other problems are eliminated by the present invention which provides for a wye-shaped dual backflow check valve in a vacuum sewage system.

In one embodiment of the present invention, the dual backflow check valve used in a vacuum sewage system has a valve body including a primary (branch) conduit with an upstream and a downstream portion and a secondary (service) conduit; and a valve flap hinged at the junction between the primary conduit and the secondary conduit such that the valve flap can prevent flow into the upstream portion of the primary conduit or into the secondary conduit. In another embodiment of the present invention, the upstream portion of the primary conduit forms a primary valve seat and the secondary conduit forms a secondary valve seat, wherein the valve flap can sealingly engage either the upstream portion of the primary conduit or the secondary conduit. Yet another embodiment of the present invention includes a rubber gasket on both the primary valve seat and the secondary valve seat. In another embodiment of the present invention, the primary conduit and the secondary conduit are oriented on a substantially horizontal plane. In still another embodiment of the present invention, the primary valve seat and the secondary valve seat are slightly angled in a direction from the valve flap hinge and toward the downstream portion of the primary conduit. In another embodiment, the upstream portion of the primary conduit and the secondary conduit form an acute angle of approximately forty five degrees.

It is therefore a primary object of the present invention to provide a dual backflow check valve used in a vacuum sewage system wherein the dual check valve can prevent backflow into either the primary (branch) line or the secondary (service) line of the vacuum sewage system.

Another important object of the present invention is to provide a dual backflow check valve which operates efficiently when both the primary conduit and the secondary conduit are oriented on a substantially horizontal plane.

It is also an important object of the present invention to provide a dual backflow check valve which allows the primary (branch) line of the drainage system to be buried at a shallower depth than necessary with the prior art, thereby significantly decreasing the costs associated with designing and installing a drainage system.

Another object of the present invention is to provide a dual backflow check valve which includes fewer profile changes than the prior art, thus allowing the design of a drainage system of greater efficiency because of increased rates of fluid flow and/or decreased probability of "waterlogging" (i.e., excessive pressure loss).

Additional objects and advantages of the present invention will become apparent and a more thorough and comprehensive understanding may be had from the following description taken in conjunction with the accompanying drawings forming a part of this specification.

BRIEF DESCRIPTION OF THE DRAWINGS

FIG. 2 is a cross-sectional view of a dual backflow check valve embodying the present invention;

DETAILED DESCRIPTION

Figure 1:
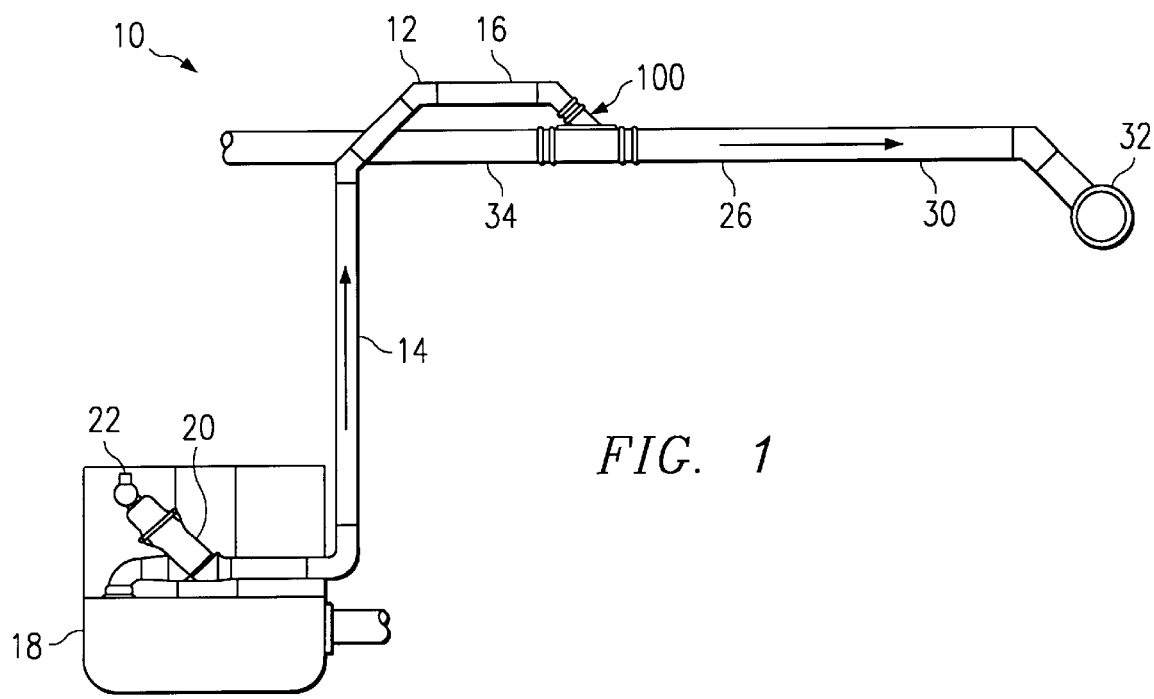
FIG. 1 is a plan view of a vacuum sewage system including a dual backflow check valve embodying the present invention.
Figure 3:
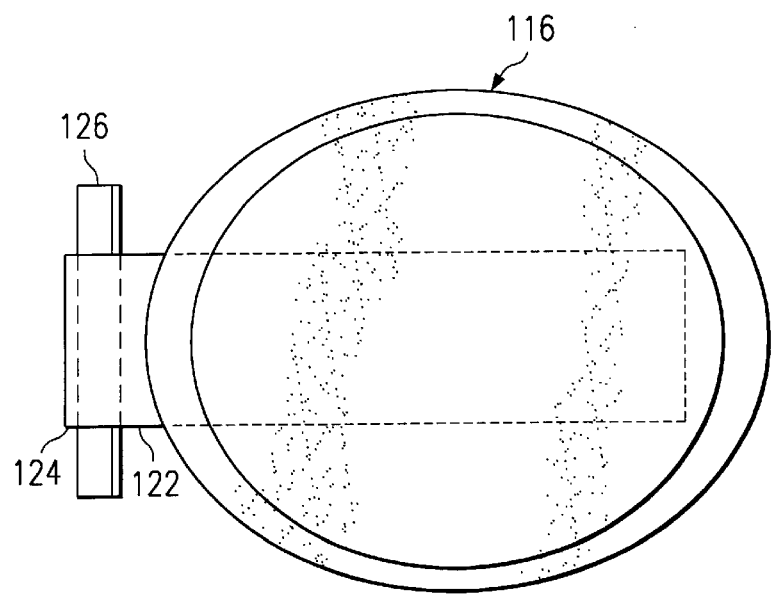
FIG. 3 is a top view of a valve flap, tab, and hinge pin used in the check valve of FIG. 2.
Figure 4:
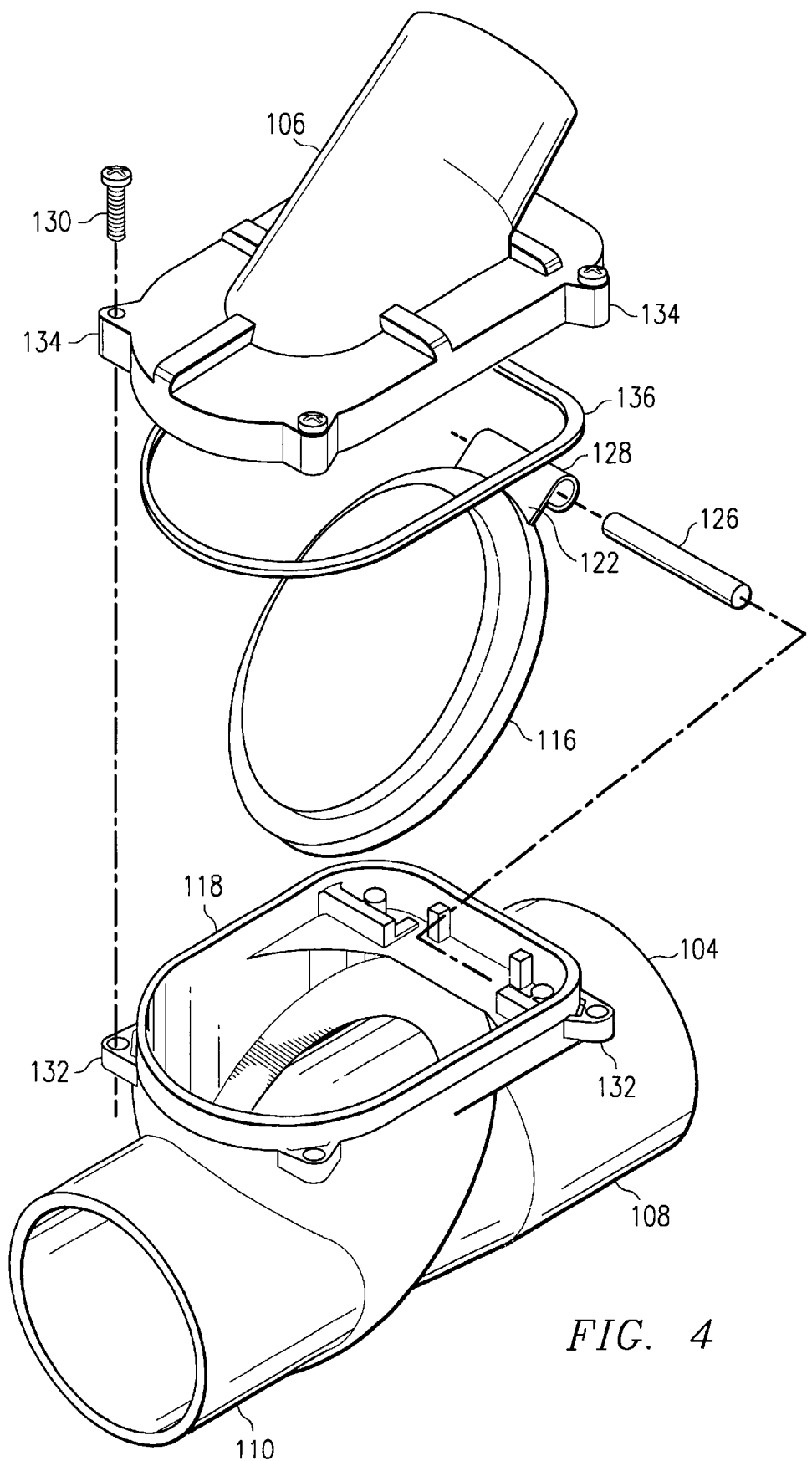
FIG. 4 is an exploded perspective view of a dual backflow check valve embodying the present invention.
Figure 5:
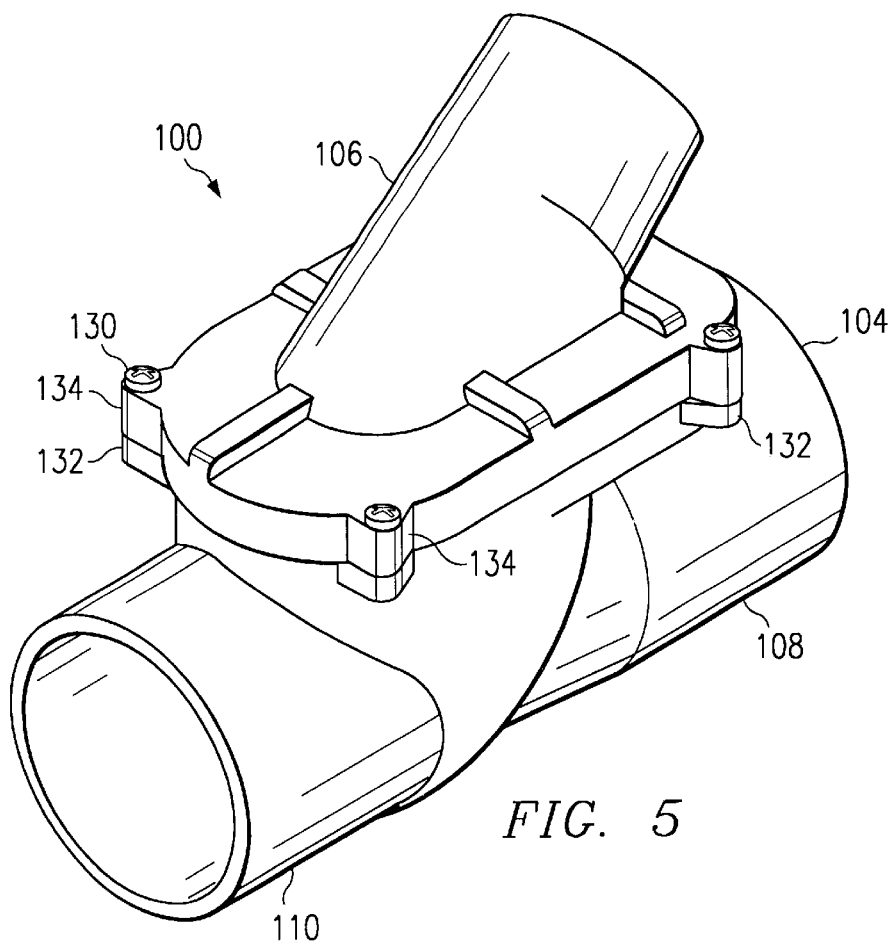
FIG. 5 is a perspective view of a dual backflow check valve embodying the present invention, wherein the primary conduit and the secondary conduit are separate components that are screwed together.

The vacuum sewage system 10 of the present invention, as illustrated in FIG. 1, includes a service line 12 having a substantially vertical discharge pipe portion 14 and a substantially horizontal pipe portion 16. In fluid communication with and downstream from the vertical discharge pipe is a first sewage holding tank 18. Operably associated with the sewage holding tank 18 is a valve unit 20 and a valve actuator 22 which senses when the sewage level in a holding tank has reached a desired discharge level. This portion of the system is described in detail in U.S. Pat. No. 4,373,838, which is hereby incorporated by reference. When the sewage level in the holding tank 18 reaches the discharge level, the actuator 22 opens the valve 20. Because the pressure on the downstream side of the valve 20 is low (i.e, under vacuum) and the holding tank is maintained at about atmospheric pressure, the opening of the valve 20 results in the evacuation of sewage from the holding tank and through the vertical discharge pipe 14. The sewage then travels through the horizontal portion 16 of the service line. Next, the sewage flows to a branch line 26 through the wye-shaped dual backflow check valve 100 which connects the service line 12 to the branch line 26. After passing through the wye check valve 100, sewage flows through the downstream portion 30 of the branch line to a main vacuum line 32. Although not shown, several service lines may be connected to the branch line with a corresponding wye check valve 100 located at the juncture between each service line and the branch line. In this manner, sewage from each of the service lines will be transported through a corresponding wye check valve and into the branch line. Another possibility not shown is to locate a wye check valve 100 between the downstream portion 30 of the branch line and the main vacuum line 32.

As shown in FIG. 2, the wye check valve 100 of the present invention has a valve body 102 comprising a primary (branch) conduit 104 and a secondary (service) conduit 106. Primary conduit 104 has an upstream portion 108 and a downstream portion 110 being aligned in such a manner that both portions 108 and 110 have substantially the same longitudinal axis. To transport fluid through valve body 102, the secondary conduit 106 forms a secondary (service) inlet 118 into valve body 102, the upstream portion 108 of primary conduit 104 forms a primary (branch) inlet 120 into valve body 102, and the downstream portion 110 of primary conduit 104 forms a primary (branch) outlet 121 out of valve body 102. In the preferred embodiment, each of secondary inlet 118, primary inlet 120, and primary outlet 121 are generally elliptical in shape.

As shown in FIG. 2, at the approximate midpoint of the upstream portion 108 of primary conduit 104, bottom wall 112 inclines upwardly. This upward incline allows the upstream portion 108 of the primary conduit to transition to the downstream portion 110 at inclined surface 113. The inclined surface 113 defines a primary (branch) valve seat 114 which encircles primary inlet 120. Valve flap 116 is seated on primary valve seat 114 when sewage is flowing through secondary conduit 106. In a preferred embodiment, encircling secondary inlet 118 is a secondary (service) valve seat 115 for seating valve flap 116 when sewage is flowing from the upstream portion 108 of primary conduit 104.

As shown in FIG. 2, the secondary or service conduit 106 joins the primary conduit 104 at a location between upstream portion 108 and downstream portion 110 and forms an acute angle with the upstream portion 108 of the primary conduit. Preferably, this angle is about 45°.

Referring to FIGS. 2–5, the internal construction of the wye check valve 100 shall be further described. Pivotally secured within valve body 102 adjacent secondary inlet 118 and primary inlet 120 is valve flap 116. Valve flap 116 is generally elliptical in shape to match the general shapes of primary valve seat 114 and secondary valve seat 115. Valve flap 116 may also include a raised seal portion 117 about its periphery to provide a better seal against primary valve seat 114. A hinge recess 128 is provided at an area between secondary inlet 118 and primary inlet 120. To pivotally secure valve flap 116 to the valve body, a hinge pin 126 is secured in hinge recess 128. A tab 122 extends from valve flap 116 and has a looped portion which forms a cylindrical hole 124 through which hinge pin 126 is rotatably inserted. Valve flap 116 and tab 122 are constructed such that the combination of the two provides a substantially rigid structure. This is particularly important in the vacuum sewage system of the present invention due to the high velocity of the sewage (10–30 feet per second) traveling through the check valve. In the preferred embodiment shown in FIGS. 2 and 3, valve flap 116 is composed of EPDM rubber and tab 122 is constructed of stainless steel and extends within flap 116 to reinforce the valve flap.

Valve body 102 may be constructed of any suitable materials known in the art. Preferably, the valve body is constructed of a glass-filled polypropylene material. Further, the valve body can be composed of a single unit. However, in the preferred embodiment shown in FIGS. 2 and 4–5, the secondary service conduit 106 and primary conduit 104 are separate unitary components that are secured to each other to form valve body 102. In this embodiment, secondary service conduit 106 comprises a unitary service component that includes secondary inlet 118 and primary conduit 104 comprises a unitary service component that includes primary inlet 120 and primary outlet 121. These separate unitary components are fastened together with screws 130 disposed through screw holes 132 and 134 in the primary conduit 104 and secondary service conduit 106, respectively. The angle of entry of fluid through secondary inlet 118 into primary conduit 104 can be varied by choosing a secondary conduit 106 from a group having secondary inlets oriented at differing angles. Additionally, a rubber gasket or seal 136 (FIG. 4) disposed between the components provides a fluid-tight seal between the conduits when they are screwed together.

Figure 6:
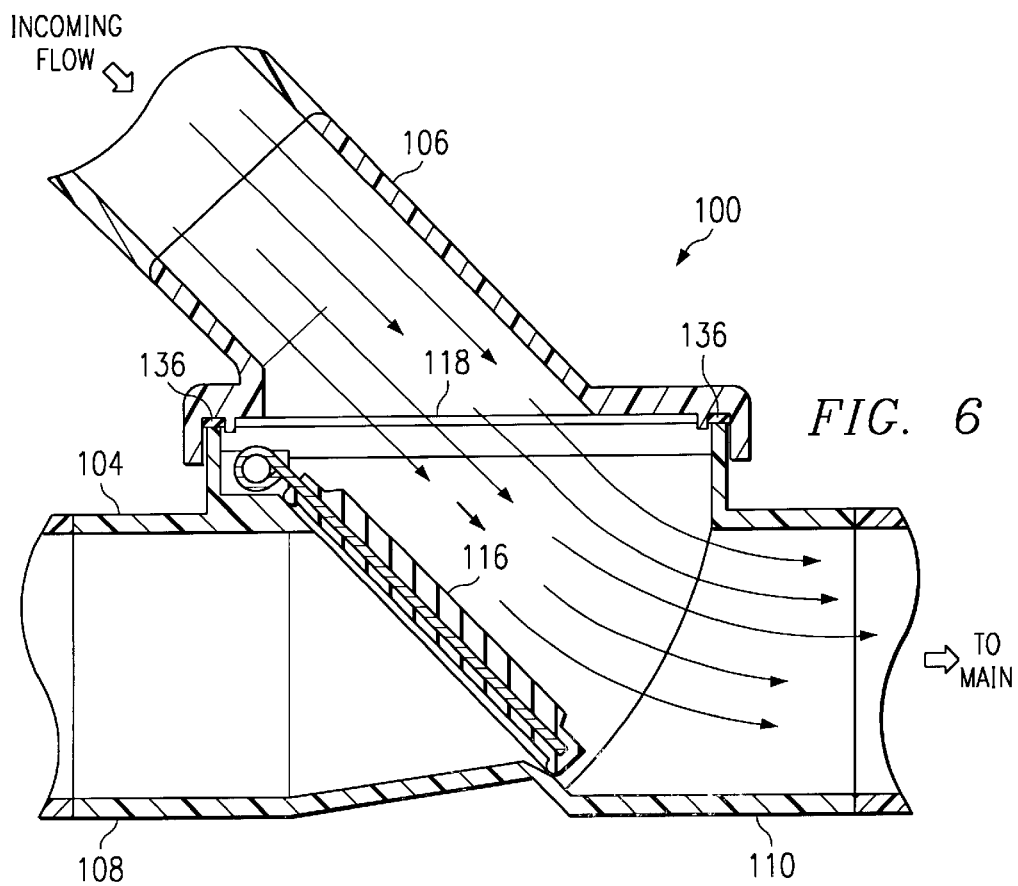
FIG. 6 is a cross-sectional view depicting fluid flow from the secondary conduit of the check valve of FIG. 2.
Figure 7:
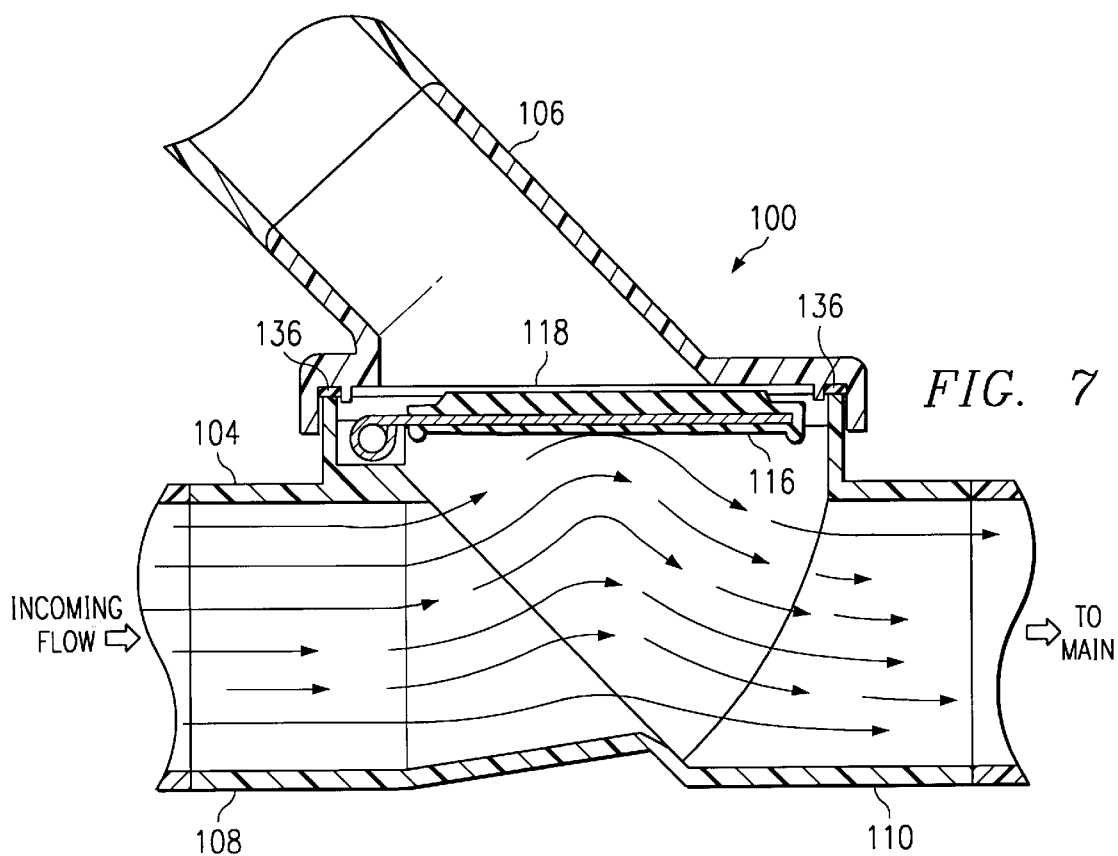
FIG. 7 is a cross-sectional view depicting fluid flow from the upstream portion of the primary conduit of the check valve of FIG. 2.

The operation of the wye check valve 10 is illustrated in FIGS. 6 and 7. In FIG. 6 there is shown the operation of the wye valve when flow is entering through the secondary (service) conduit and into the downstream portion of the branch line toward the main vacuum line. As shown, the flow of sewage through the secondary conduit holds the flap down against the primary valve seat so that no or little flow is allowed to enter the upstream portion of the branch line (see FIG. 1). FIG. 7 shows the wye check valve when flow is moving from the upstream portion to the downstream portion of the branch line. As shown, the flow of sewage through the branch line lifts the valve flap against the service valve seat, allowing sewage to flow to the downstream portion of the branch line and into the main vacuum conduit but preventing flow from entering the service line.

While FIG. 1 shows the wye check valve positioned with the secondary (service) conduit extending upwardly to receive the service line, in a preferred embodiment of the vacuum sewage system the secondary service conduit is oriented substantially horizontally and is substantially on the same plane as the branch line. Several advantages are achieved by such a horizontal orientation of the wye check valve. For example, by orienting the wye check valve on substantially the same horizontal plane as the branch line one eliminates a profile change in the system, thereby improving the efficiency of the system. In other words, a horizontal orientation allows the use of less energy in the vacuum system because the fluid flow does not experience as many changes in elevation. Another advantage of the above-described horizontal orientation of the wye check valve is that it allows the branch line and the main vacuum line to be buried at shallower depths, thereby decreasing the costs associated with designing and installing a vacuum drainage system.

Figure 8:
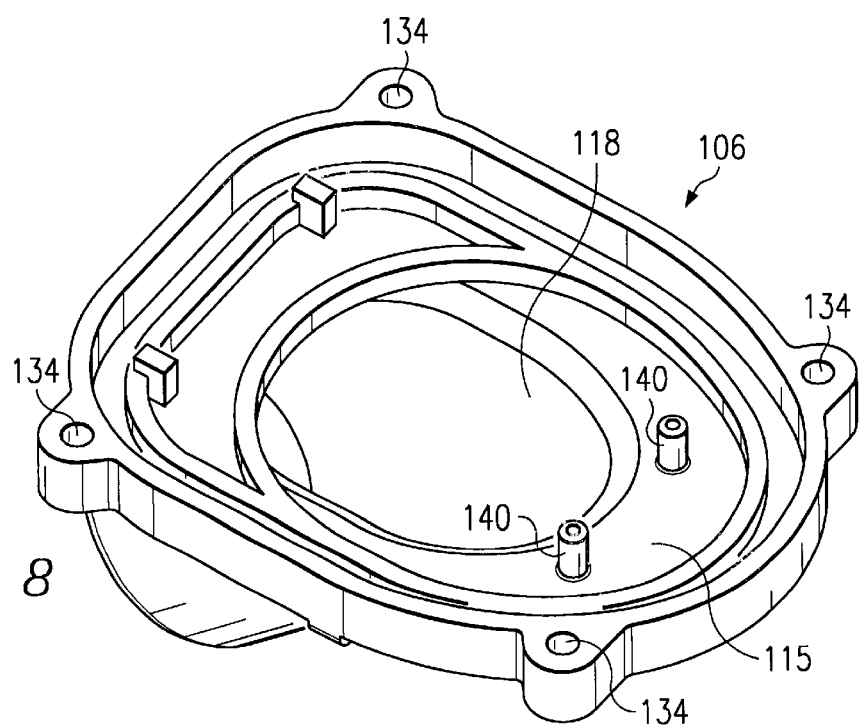
FIG. 8 is a perspective view of the service conduit of the dual backflow check valve of FIG. 4.

Other alternative embodiments of the wye valve and sewage system disclosed herein are considered to be part of the present invention. One such alternative embodiment relates to the angle of inclination of the primary valve seat 114 shown in FIG. 2. In particular, primary conduit valve seat 114 is shown to be oriented such that it extends from a position adjacent hinge pin 126 and hinge pin recess 128 and angles toward the downstream portion 110 of primary conduit 104. Angling the valve seat in this manner helps to minimize the profile change necessary as fluid flows downstream from the secondary conduit, thus further minimizing loss of fluid pressure and increasing efficiency. Similarly, secondary valve seat 115 is also angled toward the downstream portion 110 of primary conduit 104. As shown in FIG. 8, a preferred embodiment includes two seating pegs 140 located within secondary conduit 106 and extending front secondary (service) valve seat 115 in a manner that prevents valve flap 116 from fully sealing with the secondary (service) valve seat 115.

Having thus described in detail a preferred selection of embodiments of the present invention, it is to be appreciated and will be apparent to those skilled in the art that many physical changes could be made in the apparatus without altering the inventive concepts and principles embodied therein.

What is claimed is:

1. A vacuum sewage system comprising:
   a downstream vacuum source for creating a pressure vacuum in said vacuum sewage system; and
   at least one dual backflow check valve apparatus, said dual backflow check valve apparatus comprising:
      a valve body attached to said downstream vacuum source, said valve body defining a branch conduit having an upstream portion and a downstream portion, and a service conduit extending from said branch conduit from a location between the upstream portion and the downstream portion of said branch conduit and forming an acute angle with the upstream portion of said branch conduit, said branch conduit and said service conduit each having an internal bore, the internal bores of said branch conduit and said service conduit being in fluid communication and forming a service inlet;
      a branch valve seat encircling the upstream portion of said branch conduit;
      a service valve seat encircling said service inlet formed between the internal bores of said service conduit and said branch conduit; and
      a valve flap pivotally mounted inside said valve body, said valve flap having a first position wherein said valve flap seatingly engages said service valve seat and having a second position wherein said valve flap seatingly engages said branch valve seat;
      wherein said valve flap pivots to said first position and prevents backflow into said service conduit when fluid flows from the upstream portion of said branch conduit to the downstream portion of said branch conduit, and said valve flap pivots to said second position and prevents backflow into the upstream portion of said branch conduit when fluid flows from said service conduit to the downstream portion of said branch conduit.

2. The vacuum sewage system as set forth in claim 1 wherein:
   said branch valve seat is formed in said valve body by reducing the internal bore of the upstream portion of said branch conduit to a diameter less than the internal bore of the downstream portion of said branch conduit.

3. The vacuum sewage system as set forth in claim 1 wherein:
   said branch valve seat forms a plane extending at an angle from a point adjacent the pivot location of said valve flap toward the downstream portion of said branch conduit.

4. The vacuum sewage system as set forth in claim 1 wherein said valve flap comprises:
   a valve flap body having a substantially elliptical shape; and
   a tab having a secured end inserted into said valve flap body and a hinged end extending from said valve flap body.

5. The vacuum sewage system as set forth in claim 4 wherein:
   said valve flap body has a peripheral edge, said peripheral edge having a raised seal portion.

6. The vacuum sewage system as set forth in claim 1 wherein:
   said valve flap is pivoted from said first position to said second position and from said second position to said first position by a pressure vacuum applied by said downstream vacuum source to the downstream portion of said branch conduit and by a force created by fluid flow toward the downstream portion of said branch conduit.

7. The vacuum sewage system as set forth in claim 6 wherein:
   the upstream portion of said branch conduit has a longitudinal axis and the downstream portion of said branch conduit has a longitudinal axis; and
   the longitudinal axes of the upstream portion and the downstream portion of said branch conduit are substantially aligned.

8. The vacuum sewage system as set forth in claim 7 wherein:
   said branch conduit and said service conduit are oriented on a substantially horizontal plane.

9. The vacuum sewage system as set forth in claim 7 wherein:
   said valve body has an interior contour between the upstream portion of said branch conduit and the downstream portion of said branch conduit;
   said valve flap has a peripheral edge, said peripheral edge defining a curved path as said valve flap travels between said first position and said second position; and
   the interior contour of said valve body substantially conforms to said curved path defined by the peripheral edge of said valve flap.

10. The vacuum sewage system as set forth in claim 7 wherein:

at least one-seating peg extends from said service valve seat, said at least one seating peg preventing said valve flap from fully sealing said service valve seat while in said first position.

11. The vacuum sewage system as set forth in claim 7 wherein:

said acute angle formed between said service conduit and the upstream portion of said branch conduit is about 45 degrees.

12. The vacuum sewage system as set forth in claim 7 wherein:

the service conduit and the branch conduit of said valve body are separable modular components secured together with a fluid-tight seal.

13. The vacuum sewage system as set forth in claim 12 wherein:

said service conduit modular component is selected from a plurality of service conduit modular components having varying service conduit angles such that said acute angle formed between said service conduit and the upstream portion of said branch conduit is dependent on the service conduit angle of said selected service conduit modular component.

14. The vacuum sewage system as set forth in claim 12 wherein:

said valve flap comprises a rubber flap body attached to a rotatable hinge, and said rotatable hinge is rotatably secured between said service conduit modular component and said branch conduit modular component.

15. A vacuum sewage system comprising:

a main conduit having an attached vacuum source for creating a pressure vacuum in said vacuum sewage system;

a branch conduit in fluid communication with said main conduit;

at least one service conduit, said at least one service conduit being in fluid communication with said branch conduit; and at least one dual backflow check valve, said at least one dual backflow check valve being attached between said branch conduit and said at least one service conduit, said dual backflow check valve comprising:

a branch inlet attached to an upstream portion of said branch conduit;

a service inlet attached to said service conduit;

a branch outlet attached to a downstream portion of said branch conduit; and a valve flap pivotally mounted between said branch inlet and said service inlet, said valve flap having a first position wherein said valve flap blocks fluid backflow through said service inlet and having a second position wherein said valve flap blocks fluid backflow through said branch inlet.

16. The vacuum sewage system as set forth in claim 15 wherein:

said valve flap is pivoted from said first position to said second position and from said second position to said first position by the pressure vacuum created by the attached vacuum source in said main conduit and by a force created by fluid flow toward the downstream portion of said branch conduit.

17. The vacuum sewage system as set forth in claim 15 wherein:

the branch inlet and the branch outlet of said dual backflow check valve comprise a unitary branch component;

the service inlet of said dual backflow check valve comprises a unitary service component; and said unitary branch component and said unitary service component are secured together with a fluidtight seal.

18. The vacuum sewage system as set forth in claim 17 wherein:

said unitary service component is selected from a plurality of unitary service components having service inlets oriented in varying angles, the service inlet of said selected unitary service component and the branch inlet of said unitary branch component forming an angle dependent on the angle of the service inlet of said selected unitary service component.

19. The vacuum sewage system as set forth in claim 17 wherein:

said valve flap comprises a rubber flap body attached to a rotatable hinge, and said rotatable hinge is rotatably secured between said unitary service component and said unitary branch component.

20. The vacuum sewage system as set forth in claim 15 wherein:

the upstream portion of said branch conduit has a longitudinal axis and the down stream portion of said branch conduit has a longitudinal axis; and the longitudinal axes of the upstream portion and the downstream portion of said branch conduit are substantially aligned.

21. The vacuum sewage system as set forth in claim 20 wherein:

said branch conduit and said at least one service conduit are oriented on a substantially horizontal plane.

22. In a vacuum sewage system having a service conduit in fluid communication with a branch conduit, a method of preventing fluid backflow comprising:

creating a vacuum in said vacuum sewage system;

evacuating fluid through said service conduit and said branch conduit, wherein fluid in said service conduit and fluid in an upstream portion of said branch conduit is evacuated to a downstream portion of said branch conduit, said evacuation being driven by a pressure differential caused by said vacuum;

rotating a valve flap into a first position wherein said service conduit is sealed to prevent fluid backflow into said service conduit as fluid is evacuated from the upstream portion of said branch conduit to the downstream portion of said branch conduit; and rotating said valve flap into a second position wherein the upstream portion of said branch conduit is sealed to prevent fluid backflow into the upstream portion of said branch conduit as fluid is evacuated from said service conduit to the downstream portion of said branch conduit.

* * * * *